United States Patent
Kobayashi

(10) Patent No.: US 10,442,919 B2
(45) Date of Patent: Oct. 15, 2019

(54) HYDROGENATED NITRILE RUBBER COMPOSITION AND DRIVETRAIN OIL SEAL

(71) Applicant: NOK Corporation, Tokyo (JP)

(72) Inventor: Atsushi Kobayashi, Kanagawa (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/536,972

(22) PCT Filed: Dec. 8, 2015

(86) PCT No.: PCT/JP2015/084441
§ 371 (c)(1),
(2) Date: Jun. 16, 2017

(87) PCT Pub. No.: WO2016/098647
PCT Pub. Date: Jun. 23, 2016

(65) Prior Publication Data
US 2017/0355838 A1   Dec. 14, 2017

(30) Foreign Application Priority Data

Dec. 18, 2014   (JP) ................................. 2014-256689

(51) Int. Cl.
| | |
|---|---|
| *C08L 15/00* | (2006.01) |
| *C08K 3/04* | (2006.01) |
| *C08K 3/34* | (2006.01) |
| *C09K 3/10* | (2006.01) |
| *F16J 15/20* | (2006.01) |
| *C08L 9/02* | (2006.01) |
| *F16J 15/3236* | (2016.01) |

(52) U.S. Cl.
CPC .............. *C08L 15/005* (2013.01); *C08K 3/04* (2013.01); *C08K 3/34* (2013.01); *C08L 9/02* (2013.01); *C08L 15/00* (2013.01); *C09K 3/10* (2013.01); *F16J 15/20* (2013.01); *F16J 15/3236* (2013.01)

(58) Field of Classification Search
CPC . C08L 15/00; C08L 15/005; C08L 9/02; F16J 15/3236; F16J 15/3204
See application file for complete search history.

(56) References Cited

U.S. PATENT DOCUMENTS

| | | | |
|---|---|---|---|
| 2001/0000788 A1 | 5/2001 | Ono et al. | |
| 2002/0061961 A1* | 5/2002 | Yabe ........................ | C08K 3/04 524/827 |
| 2003/0002759 A1* | 1/2003 | Yabe ........................ | B60B 27/00 384/484 |
| 2004/0266938 A1* | 12/2004 | Tokumitsu ............... | C08K 3/04 524/495 |
| 2009/0258980 A1* | 10/2009 | Moritani .............. | C08K 5/0025 524/284 |

FOREIGN PATENT DOCUMENTS

| | | |
|---|---|---|
| CN | 103836097 A | 6/2014 |
| JP | 9111048 | 4/1997 |
| JP | H11-050047 A | 2/1999 |
| JP | H11-193332 A | 7/1999 |
| JP | H11-279529 A | 10/1999 |
| JP | 2002-080639 A | 3/2002 |
| JP | 2003166547 | 6/2003 |
| JP | 2003-194235 A | 7/2003 |
| JP | 2003-222147 A | 8/2003 |
| JP | 2003-336745 A | 11/2003 |
| JP | 2005-042897 A | 2/2005 |

OTHER PUBLICATIONS

International Search Report for Patent Application No. PCT/JP2015/084441 dated Mar. 15, 2016 (5 pages).
Written Opinion for Patent Application No. PCT/JP2015/084441 dated Mar. 15, 2016 (9 pages).
First Chinese Office Action for Patent Application No. CN 201580068499.2 dated Apr. 4, 2018 (13 pages).
Extended European Search Report for Patent Application No. EP 15869852.2 dated May 7, 2018 (5 pages).
Second Chinese Office Action for Patent Application No. CN 201580068499.2 dated Oct. 9, 2018 (10 pages).
Japanese Office Action for Patent Application No. JP 2014-256689 dated Jan. 15, 2019 (7 pages).
Rejection Decision for corresponding Chinese Application No. 201580068499.2 dated Mar. 25, 2019 with English translation (10 pages).

* cited by examiner

*Primary Examiner* — Peter D. Mulcahy
(74) *Attorney, Agent, or Firm* — Harness, Dickey & Pierce, P.L.C.

(57) ABSTRACT

A hydrogenated nitrile rubber composition and a drivetrain oil seal whereby seal squeal can be prevented even upon wearing away of the sealing or even under dry lubrication conditions without any grease. The hydrogenated nitrile rubber composition comprises 100 parts by weight of hydrogenated nitrile rubber and further 10 to 55 parts by weight of wollastonite and 10 to 55 parts by weight of graphite as fillers, the total amount of the fillers being 50 to 110 parts by weight. The drivetrain oil seal comprises a crosslinked product of the hydrogenated nitrile rubber composition.

2 Claims, 1 Drawing Sheet

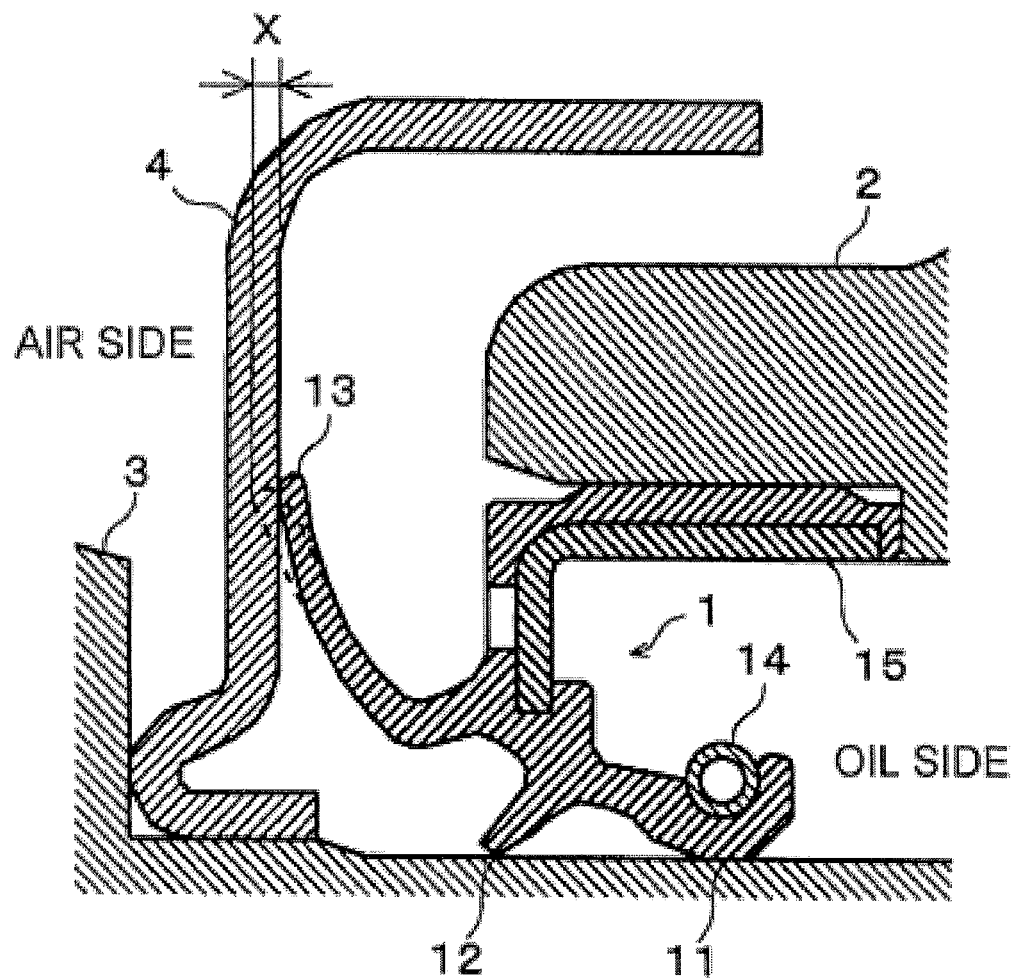

HYDROGENATED NITRILE RUBBER COMPOSITION AND DRIVETRAIN OIL SEAL

TECHNICAL FIELD

The present invention relates to a hydrogenated nitrile rubber composition and a drivetrain oil seal obtained from the rubber composition.

BACKGROUND OF THE INVENTIONS

Acrylic rubber (ACM) has been used in conventional drivetrain oil seals in view of suitability for ambient temperatures at which they are used (−35° C. to 150° C.).

However, in an environment such as Latin America where it is often necessary to drive on a water-covered road, intrusion of muddy water may cause foreign matters to get stuck in a sliding portion of a sealing, leading to oil leakage due to wear of the sealing.

It has been proposed to use hydrogenated nitrile rubber (HNBR) for sealing technology. Patent Document 1 describes a composition containing a combination of HNBR and NBR and its use as a base material of a gasket. Patent Document 2 describes a composition comprising a silicone oil and a fluorinated polymer together with a rubber such as HNBR and its use for a ball bearing.

PRIOR ART DOCUMENTS

Patent Documents

Patent Document 1: JP-A-9-111048
Patent Document 2: JP-A-2003-166547

SUMMARY

Problem to be Solved by the Invention

The present inventor has conducted a study on a drivetrain oil seal to provide a side lip closer to the air than a main lip for sealing an oil. And the present inventor has conducted a study in a drivetrain oil seal to use hydrogenated nitrile rubber (HNBR), which is highly resistant to muddy water and dust, as the material of the sealing.

These modifications make it possible to prevent intrusion of muddy water and dust on the main lip and thus limit the decrease in service life of the sealing.

However, a new problem has been found in that seal squeal occurs in a side lip sliding portion, in particular between the side lip and a deflector with which the side lip is in slidable contact.

To prevent friction and wear caused by poor lubrication, a grease is applied to the side lip sliding portion. However, the grease can be washed away by muddy water or exhausted during use over time, and this causes wearing away of the sealing and deterioration of the lubrication conditions, leading to the occurrence of seal squeal due to poor lubrication between the side lip and the deflector.

It is therefore an object of the present invention to provide a hydrogenated nitrile rubber composition and a drivetrain oil seal whereby seal squeal can be prevented even upon wearing away of the sealing or even under dry lubrication conditions without any grease.

The other objects of the present invention will be apparent from the following description.

Means for Solving Problem

The above-described problems are solved by the following respective inventions.

A hydrogenated nitrile rubber composition comprising 100 parts by weight of hydrogenated nitrile rubber, and further 10 to 55 parts by weight of wollastonite and 10 to 55 parts by weight of graphite as fillers, the total amount of the fillers being 50 to 110 parts by weight.

The hydrogenated nitrile rubber composition as disclosed above and further comprising carbon black.

A drivetrain oil seal comprising a crosslinked product of the hydrogenated nitrile rubber composition as disclosed above.

The drivetrain oil seal as disclosed above, wherein the drivetrain oil seal has a side lip with an edge face that serves as a sliding sealing face.

Effect of the Invention

The present invention can provide a rubber composition and a drivetrain oil seal whereby seal squeal can be prevented even upon wearing away of the sealing or even under dry lubrication conditions without any grease.

The present invention can further provide a rubber composition and a drivetrain oil seal whereby the increase in compression set can be reduced.

Thus, the present inventor has found that seal squeal occurs due to stick-slip during operation in a low speed range in which the friction coefficient is particularly higher, and has succeeded in preventing the seal squeal and reducing an increase in compression set by incorporating predetermined amounts of two fillers into HNBR to control the friction properties.

BRIEF DESCRIPTION OF THE DRAWINGS

The drawing is a cross-sectional view showing an example of a sealing structure including a drivetrain oil seal.

DETAILED DESCRIPTION OF THE INVENTIONS

Hereinafter, embodiments of the present invention will be described.

A hydrogenated nitrile rubber composition of the present invention comprises 100 parts by weight of hydrogenated nitrile rubber (HNBR) as a polymer, and further 10 to 55 parts by weight of wollastonite and 10 to 55 parts by weight of graphite as fillers, the total amount of the fillers being 50 to 110 parts by weight.

With the use of a drivetrain oil seal comprising a crosslinked product obtained by crosslinking of the above hydrogenated nitrile rubber composition, seal squeal can be prevented even upon wearing away of the sealing or even under dry lubrication conditions without any grease, and the effect of reducing the increase in compression set can also be obtained.

The hydrogenated nitrile rubber that can be preferably used is one having a bound acrylonitrile content of 15 to 45 weight %.

The hydrogenated nitrile rubber is available as a commercial product, and, for example, "Zetpol 2010", "Zetpol 2020", and "Zetpol 4310" which are manufactured by Zeon Corporation can be preferably used.

In terms of achieving the effect of the present invention to a significant degree, it is preferable that the hydrogenated nitrile rubber not be used in combination with nitrile rubber (NBR). Use of such a hydrogenated nitrile rubber composition can improve the ageing and heat resistance particularly in applications of high service temperatures such as a drivetrain oil seal.

The wollastonite, which is composed of calcium silicate ($CaSiO_3$), is available as a commercial product, and, for example, "NYAD 400" (having a fiber length of 35 μm, a fiber diameter of 7 μm, and an aspect ratio of 5) manufactured by NYCO Minerals, Inc. can be preferably used.

The graphite is available as a commercial product, and, for example "graphite A-0" manufactured by Nichiden Carbon Co., Ltd. can be preferably used.

It is preferable to incorporate carbon black into the hydrogenated nitrile rubber composition of the present invention.

An example of the carbon black that can be preferably used is FEF carbon black. The use of FEF carbon black for the hydrogenated nitrile rubber composition of the present invention provides the composition with good kneading properties, and also the effect of achieving a good balance of normal physical properties, permanent set resistance, and the like of a rubber product obtained from the composition.

When carbon black is used, the amount of carbon black is preferably, but not necessarily limited to, 50 parts by weight or less per 100 parts by weight of the hydrogenated nitrile rubber.

As well as the above components, other components required in terms of crosslinking and physical properties can be optionally incorporated into the rubber composition of the present invention.

Examples of the components required in terms of crosslinking include a crosslinking agent and a crosslinking aid.

Examples of the components required in terms of physical properties include an anti-ageing agent.

The drivetrain oil seal of the present invention comprises a crosslinked product obtained by crosslinking of the rubber composition described thus far.

Hereinafter, an example of the drivetrain oil seal of the present invention will be described with reference to the drawing.

The drawing is a cross-sectional view showing an example of a sealing structure including the drivetrain oil seal.

In the drawing, the reference numeral 1 denotes the drivetrain oil seal. The drivetrain oil seal 1 is formed in a ring shape as a whole.

The drivetrain oil seal 1 has three sealing lips 11, 12, and 13. The first sealing lip 11 and the second sealing lip 12 are provided on the inner circumference of the drivetrain oil seal 1 of ring shape, while the third sealing lip 13 is provided on the side of the drivetrain oil seal 1.

The reference numeral 14 denotes an annular spring that helps sealing by the first sealing lip 11, and this spring can be made of, for example, metal. The reference numeral 15 denotes a metal ring.

In the sealing structure shown, the drivetrain oil seal 1 is fixed to a housing 2 and arranged to seal the gap between the housing 2 and the shaft 3.

The first sealing lip 11 functions as a main lip and is located closest to the oil among the three sealing lips 11, 12, and 13. The first sealing lip 11 is brought into slidable contact with the shaft 3 so that the oil can be sealed.

The second sealing lip 12 is located closer to the air than the first sealing lip 11. The second sealing lip 12 is brought into slidable contact with the shaft 3 so that the sealing of the oil can be ensured.

The third sealing lip 13 functions as a side lip and is located closest to the air among the three sealing lips 11, 12, and 13. The edge face of the third sealing lip 13 serves as a sliding sealing face, and is brought into slidable contact with a deflector 4 fixed to the shaft 3, so that muddy water and dust can be prevented from intruding on the oil side through the air side.

The third sealing lip 13 is disposed to provide a predetermined interference X with respect to the deflector 4, and thus presses the deflector 4 to perform its sealing function.

The first sealing lip 11 and the second sealing lip 12 press the shaft 3 in the radial direction of the sealing 1 (in the downward direction in the figure) to perform their sealing functions, while the third sealing lip 13 presses the deflector 4 in a direction perpendicular to the radial direction of the sealing 1 (in the lateral direction with respect to the sealing 1, i.e., the left direction in the figure) to perform its sealing function.

A lubrication effect on the sealing faces (sliding portions) of the first sealing lip 11 and the second sealing lip 12 of the sealing 1 can easily be maintained by the oil to be sealed, whereas such a lubrication effect is difficult to obtain for the third sealing lip 13. Thus, a grease or the like is additionally used to maintain the lubrication of the third sealing lip 13.

In the case of a conventional drivetrain oil seal, it often happens that washing away of a grease by muddy water or exhaustion of the grease during use over time causes wearing away of the sealing and deterioration of the lubrication conditions, leading to the occurrence of seal squeal due to poor lubrication between the side lip and the deflector. By contrast, with the use of the drivetrain oil seal of the present invention, seal squeal can be prevented even upon wearing away of the sealing or even under dry lubrication conditions without any grease, and the effect of reducing the increase in compression set can also be obtained.

EXAMPLES

Hereinafter, examples of the present invention will be described. The present invention is not limited by these examples.

Example 1

| | |
|---|---|
| Hydrogenated nitrile rubber, bound acrylonitrile content: 36 weight % ("Zetpol 2010" manufactured by Zeon Corporation): | 100 parts by weight |
| Wollastonite ("NYAD 400" manufactured by NYCO Minerals, Inc.): | 30 parts by weight |
| Graphite ("graphite A-0" manufactured by Nichiden Carbon Co., Ltd): | 20 parts by weight |
| Carbon black (FEF carbon black): | 50 parts by weight |
| Crosslinking agent: | 5 parts by weight |
| Crosslinking aid: | 4 parts by weight |

The above components were kneaded with a kneader and an open roll mill, and the resulting kneaded product was subjected to press crosslinking (primary crosslinking) at 150° C. to 200° C. for 3 to 30 minutes and oven crosslinking (secondary crosslinking) at 200° C. to 230° C. for 9 to 22 hours, yielding a crosslinked product of a hydrogenated nitrile rubber composition.

<Evaluation Methods>
1. Hardness (Duro A)

The hardness of the obtained crosslinked product of a hydrogenated nitrile rubber composition was measured using a type A durometer (instant) according to JIS K 6253:1997.

2. Tensile Strength (MPa

The tensile strength of the obtained crosslinked product of a hydrogenated nitrile rubber composition was measured according to JIS K 6251:2010.

3. Elongation at Break (%)

The elongation at break of the obtained crosslinked product of a hydrogenated nitrile rubber composition was measured according to JIS K 6251:2010.

4. Check for abnormal noise (seal squeal)

A drivetrain oil seal was obtained as the crosslinked product of a hydrogenated nitrile rubber composition by crosslinking and molding, and the drivetrain oil seal was incorporated into a sealing structure as shown in the drawing.

A length of 0.7 mm of the tip of the side lip was worn down, and whether abnormal noise (seal squeal) occurs was examined under dry lubrication conditions without any grease and at low rotation speeds (ranging from 10 rpm to 250 rpm), with the interference X set to about 5 mm.

5. Compression Set

An annular sealing member having an O-shaped (circular) cross-section (ring diameter=φ3.1 cm) was obtained as the crosslinked product of a hydrogenated nitrile rubber composition by crosslinking and molding, and the compression set (%) of the sealing member was measured after heat ageing at 120° C. for 70 hours according to JIS K 6262:2013. The compression ratio was 25%.

The results of the above evaluations are shown in Table 1.

Example 2

A crosslinked product of a hydrogenated nitrile rubber composition was prepared in the same manner as in Example 1 for evaluations, except that the amount of wollastonite was 40 parts by weight, that the amount of graphite was 10 parts by weight, and that the amount of carbon black was adjusted to 50 parts by weight so as to achieve the same level of rubber hardness as in Example 1. The results of the evaluations are shown in Table 1.

Example 3

A crosslinked product of a hydrogenated nitrile rubber composition was prepared in the same manner as in Example 1 for evaluations, except that the amount of wollastonite was 10 parts by weight, that the amount of graphite was 40 parts by weight, and that the amount of carbon black was adjusted to 50 parts by weight so as to achieve the same level of rubber hardness as in Example 1. The results of the evaluations are shown in Table 1.

Example 4

A crosslinked product of a hydrogenated nitrile rubber composition was prepared in the same manner as in Example 1 for evaluations, except that the amount of wollastonite was 40 parts by weight, that the amount of graphite was 40 parts by weight, and that the amount of carbon black was adjusted to 35 parts by weight so as to achieve the same level of rubber hardness as in Example 1. The results of the evaluations are shown in Table 1.

Example 5

A crosslinked product of a hydrogenated nitrile rubber composition was prepared in the same manner as in Example 1 for evaluations, except that the amount of wollastonite was 50 parts by weight, that the amount of graphite was 50 parts by weight, and that the amount of carbon black was adjusted to 30 parts by weight so as to achieve the same level of rubber hardness as in Example 1. The results of the evaluations are shown in Table 1.

Example 6

A crosslinked product of a hydrogenated nitrile rubber composition was prepared in the same manner as in Example 1 for evaluations, except that the amount of wollastonite was 10 parts by weight, that the amount of graphite was 55 parts by weight, and that the amount of carbon black was adjusted to 45 parts by weight so as to achieve the same level of rubber hardness as in Example 1. The results of the evaluations are shown in Table 1.

Example 7

A crosslinked product of a hydrogenated nitrile rubber composition was prepared in the same manner as in Example 1 for evaluations, except that the amount of wollastonite was 55 parts by weight, that the amount of graphite was 10 parts by weight, and that the amount of carbon black was adjusted to 45 parts by weight so as to achieve the same level of rubber hardness as in Example 1. The results of the evaluations are shown in Table 1.

Comparative Example 1

A crosslinked product of a hydrogenated nitrile rubber composition was prepared in the same manner as in Example 1 for evaluations, except that the amount of wollastonite was 30 parts by weight, that graphite was not used (0 parts by weight), and that the amount of carbon black was adjusted to 60 parts by weight so as to achieve the same level of rubber hardness as in Example 1. The results of the evaluations are shown in Table 1.

Comparative Example 2

A crosslinked product of a hydrogenated nitrile rubber composition was prepared in the same manner as in Example 1 for evaluations, except that the amount of wollastonite was 30 parts by weight, that the amount of graphite was 10 parts by weight, and that the amount of carbon black was adjusted to 55 parts by weight so as to achieve the same level of rubber hardness as in Example 1. The results of the evaluations are shown in Table 1.

Comparative Example 3

A crosslinked product of a hydrogenated nitrile rubber composition was prepared in the same manner as in Example 1 for evaluations, except that the amount of wollastonite was 40 parts by weight, that graphite was not used (0 parts by weight), and that the amount of carbon black was adjusted to 55 parts by weight so as to achieve the same level of rubber hardness as in Example 1. The results of the evaluations are shown in Table 1.

Comparative Example 4

A crosslinked product of a hydrogenated nitrile rubber composition was prepared in the same manner as in Example 1 for evaluations, except that the amount of wollastonite was 60 parts by weight, that graphite was not used (0 parts by weight), and that the amount of carbon black was adjusted to 45 parts by weight so as to achieve the same level of rubber hardness as in Example 1. The results of the evaluations are shown in Table 1.

Comparative Example 5

A crosslinked product of a hydrogenated nitrile rubber composition was prepared in the same manner as in Example 1 for evaluations, except that wollastonite was not used (0 parts by weight), that the amount of graphite was 30 parts by weight, and that the amount of carbon black was adjusted to 60 parts by weight so as to achieve the same level of rubber hardness as in Example 1. The results of the evaluations are shown in Table 1.

Comparative Example 6

A crosslinked product of a hydrogenated nitrile rubber composition was prepared in the same manner as in Example 1 for evaluations, except that the amount of wollastonite was 10 parts by weight, that the amount of graphite was 30 parts by weight, and that the amount of carbon black was adjusted to 55 parts by weight so as to achieve the same level of rubber hardness as in Example 1. The results of the evaluations are shown in Table 1.

Comparative Example 7

A crosslinked product of a hydrogenated nitrile rubber composition was prepared in the same manner as in Example 1 for evaluations, except that wollastonite was not used (0 parts by weight), that the amount of graphite was 40 parts by weight, and that the amount of carbon black was adjusted to 55 parts by weight so as to achieve the same level of rubber hardness as in Example 1. The results of the evaluations are shown in Table 1.

Comparative Example 8

A crosslinked product of a hydrogenated nitrile rubber composition was prepared in the same manner as in Example 1 for evaluations, except that wollastonite was not used (0 parts by weight), that the amount of graphite was 60 parts by weight, and that the amount of carbon black was adjusted to 45 parts by weight so as to achieve the same level of rubber hardness as in Example 1. The results of the evaluations are shown in Table 1.

Comparative Example 9

A crosslinked product of a hydrogenated nitrile rubber composition was prepared in the same manner as in Example 1 for evaluations, except that the amount of wollastonite was 60 parts by weight, that the amount of graphite was 60 parts by weight, and that the amount of carbon black was adjusted to 25 parts by weight so as to achieve the same level of rubber hardness as in Example 1. The results of the evaluations are shown in Table 1.

TABLE 1

| | | Example 1 | Example 2 | Example 3 | Example 4 | Example 5 | Example 6 | Example 7 | Comp. Example 1 | Comp. Example 2 |
|---|---|---|---|---|---|---|---|---|---|---|
| Rubber | HNBR | 100 | 100 | 100 | 100 | 100 | 100 | 100 | 100 | 100 |
| Carbon black | FEF black | 50 | 50 | 50 | 35 | 30 | 45 | 45 | 60 | 55 |
| Fillers | Wollastonite | 30 | 40 | 10 | 40 | 50 | 10 | 55 | 30 | 30 |
| | Graphite | 20 | 10 | 40 | 40 | 50 | 55 | 10 | 0 | 10 |
| | Total parts of fillers | 50 | 50 | 50 | 80 | 100 | 65 | 65 | 30 | 40 |
| Normal-state value | Hardness (Duro A) | 80 | 80 | 81 | 81 | 82 | 82 | 82 | 81 | 80 |
| | Tensile strength (MPa) | 16.5 | 16.6 | 16.0 | 15.1 | 14.7 | 15.6 | 15.8 | 17.1 | 16.8 |
| | Elongation at break (%) | 250 | 250 | 250 | 220 | 200 | 230 | 230 | 280 | 270 |
| | Occurrence of abnormal noise (seal squeal) | Did not occur | Did not occur | Did not occur | Did not occur | Did not occur | Did not occur | Did not occur | Occurred | Occurred |
| | Compression set (%) 120° C., 70 h | 27 | 26 | 29 | 35 | 42 | 32 | 30 | 22 | 25 |

| | | Comp. Example 3 | Comp. Example 4 | Comp. Example 5 | Comp. Example 6 | Comp. Example 7 | Comp. Example 8 | Comp. Example 9 |
|---|---|---|---|---|---|---|---|---|
| Rubber | HNBR | 100 | 100 | 100 | 100 | 100 | 100 | 100 |
| Carbon black | FEF black | 55 | 45 | 60 | 55 | 55 | 45 | 25 |
| Fillers | Wollastonite | 40 | 60 | 0 | 10 | 0 | 0 | 60 |

TABLE 1-continued

|  |  |  |  |  |  |  |  |  |
|---|---|---|---|---|---|---|---|---|
|  | Graphite | 0 | 0 | 30 | 30 | 40 | 60 | 60 |
|  | Total parts of fillers | 40 | 60 | 30 | 40 | 40 | 60 | 120 |
| Normal-state value | Hardness (Duro A) | 81 | 80 | 81 | 81 | 80 | 80 | 81 |
|  | Tensile strength (MPa) | 16.8 | 15.8 | 17.3 | 17.0 | 16.8 | 15.7 | 13.8 |
|  | Elongation at break (%) | 280 | 250 | 250 | 250 | 250 | 250 | 200 |
|  | Occurrence of abnormal noise (seal squeal) | Occurred | Occurred | Occurred | Occurred | Occurred | Occurred | Did not occur |
|  | Compression set (%) 120° C., 70 h | 25 | 29 | 24 | 27 | 28 | 31 | 50 |

<Evaluations>

Table 1 reveals that the use of hydrogenated nitrile rubber compositions of Examples 1 to 7 causes no abnormal noise. The successful prevention of squeal is presumably due to a reduced friction coefficient between the side lip and the deflector. Furthermore, it can be seen that the use of the rubber compositions of Examples 1 to 7 also yields a low value of compression set.

It can be seen that, by contrast, the use of the hydrogenated nitrile rubber compositions of Comparative Examples 1 to 8 causes abnormal noise.

It can also be seen that the use of the hydrogenated nitrile rubber composition of Comparative Example 9 causes no abnormal noise, but yields an increased compression set.

EXPLANATIONS OF LETTERS OR NUMERALS

1: Drivetrain oil seal
11: First sealing lip (main lip)
12: Second sealing lip
13: Third sealing lip (side lip)
14: Annular spring
15: Metal ring
2: Housing
3: Shaft
4: Deflector
X: Interference

I claim:

1. A drivetrain oil seal having a side lip with an edge face that serves as a sliding sealing face, comprising a cross-linked product of a hydrogenated nitrile rubber composition which comprises 100 parts by weight of hydrogenated nitrile rubber, and further 10 to 55 parts by weight of wollastonite and 10 to 55 parts by weight of graphite as fillers, the total amount of the fillers being 50 to 110 parts by weight.

2. The drivetrain oil seal according to claim 1, wherein the hydrogenated nitrile rubber composition further comprises carbon black.

* * * * *